(12) United States Patent
Mazarguil et al.

(10) Patent No.: US 9,738,377 B2
(45) Date of Patent: Aug. 22, 2017

(54) AIRCRAFT WHEEL EQUIPPED WITH MEANS FOR THE ROTATIONAL DRIVING THEREOF BY A DRIVE ACTUATOR

(71) Applicant: MESSIER-BUGATTI-DOWTY, Velizy-Villacoublay (FR)

(72) Inventors: Nicolas Mazarguil, Velizy-Villacoublay (FR); Sébastien Remond, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 150 days.

(21) Appl. No.: 14/734,700

(22) Filed: Jun. 9, 2015

(65) Prior Publication Data

US 2015/0360772 A1 Dec. 17, 2015

(30) Foreign Application Priority Data

Jun. 13, 2014 (FR) ...................................... 14 55450

(51) Int. Cl.
*B64C 25/40* (2006.01)
*B64C 25/36* (2006.01)
*B64C 25/42* (2006.01)

(52) U.S. Cl.
CPC .............. *B64C 25/40* (2013.01); *B64C 25/36* (2013.01); *B64C 25/405* (2013.01); *B64C 25/42* (2013.01); *Y02T 50/823* (2013.01)

(58) Field of Classification Search
CPC ......... B64C 25/34; B64C 25/36; B64C 25/40; B64C 25/405
USPC ............................. 301/6.2; 244/103 R, 103 S
See application file for complete search history.

(56) References Cited

U.S. PATENT DOCUMENTS

| 2,451,771 | A | * | 10/1948 | Perkins | ................... | B64C 25/40 |
|---|---|---|---|---|---|---|
| | | | | | | 244/103 S |
| 2,666,604 | A | * | 1/1954 | Davis | ...................... | B64C 25/40 |
| | | | | | | 244/103 S |
| 2013/0233969 | A1 | * | 9/2013 | Charles | ................... | B64C 25/36 |
| | | | | | | 244/103 R |
| 2015/0321751 | A1 | * | 11/2015 | Mazarguil | ............... | B64C 25/34 |
| | | | | | | 301/6.2 |
| 2016/0176516 | A1 | * | 6/2016 | Mazarguil | ............. | B64C 25/405 |
| | | | | | | 244/103 S |

FOREIGN PATENT DOCUMENTS

| EP | 2 639 160 A2 | 9/2013 |
|---|---|---|
| EP | 2 746 611 A1 | 6/2014 |
| EP | 2 803 569 A1 | 11/2014 |
| FR | 2 990 188 A1 | 11/2013 |

OTHER PUBLICATIONS

French Preliminary Search Report of FR 1455450, dated Mar. 17, 2015.

* cited by examiner

*Primary Examiner* — Jason Bellinger
(74) *Attorney, Agent, or Firm* — Sughrue Mion, PLLC

(57) ABSTRACT

An aircraft wheel having a rim having brake discs driving keys (21). The wheel has a rotational driver mechanism (210) which includes a drive gear (211) associated with coupling members (212) of the drive gear to the rim of the wheel. The coupling members are fixed to the rim by fixing members (220) introduced into orifices of the rim extending at an end of the keys which are also used to hold heat shields protecting the rim.

7 Claims, 4 Drawing Sheets

AIRCRAFT WHEEL EQUIPPED WITH MEANS FOR THE ROTATIONAL DRIVING THEREOF BY A DRIVE ACTUATOR

The invention relates to an aircraft wheel equipped with means for the rotational driving thereof by a drive actuator.

TECHNICAL BACKGROUND OF THE INVENTION

The advantage of motorizing the wheels of an aircraft, allowing it to move without the help of its jet engines, has recently been recognized. In this respect, aircraft wheels provided with means for their rotational driving by a drive actuator mounted on the lower part of the landing gear are known in the art. These driving means comprise a ring gear rigidly attached to the rim of the wheel. Recently, it has been proposed in document EP 2 639 160 that a ring gear should be coupled with a wheel rim by means of coupling members exhibiting play capable of allowing a relative movement between the ring gear and the rim of the wheel. The ring gear is mounted on end fittings extending from one side of a rim of the wheel. These arrangements require the fabrication of specific wheels which must be certified in order to be used on aircrafts which are already in service.

OBJECT OF THE INVENTION

The object of the invention is an aircraft wheel provided with means for the rotational driving thereof mounted on the wheel, being of simplified construction.

PRESENTATION OF THE INVENTION

With a view to achieving this goal, an aircraft wheel provided with rotational driving means is proposed, the driving means comprising a drive gear associated with coupling the members of the drive gear with a rim of the wheel, in which, according to the invention, the coupling members are fixed to the rim by fixing members introduced into orifices of the rim extending at an end of the keys which are also used to hold heat shields protecting the rim.

Hence, benefit is derived from the existence of orifices on the braked wheels, which orifices serve to hold the heat shields in order to protect the rim and brake keys (these members serve to secure the rim of the wheel and the rotor discs of the brake during rotation) to mount the coupling means of the gear there, such that it is possible to use the existing wheels without any modification or special certification requirement, because the introduction of the drive torque in the wheel during rotation takes place at substantially the same level as the introduction of the braking torque and the drive torque is far less significant than the braking torque from which the wheel dimensions are derived.

According to a particular embodiment of the invention, the drive gear comprises a disc which is fixed to the rim by means of coupling members. The disc is preferably made in a material having the same flexibility as that of the rim, so that it can follow deformations therein. Protusions are then mounted on the disc to form driving teeth on the wheel during rotation.

PRESENTATION OF THE FIGURES

The invention will be easier to understand in light of the following description of a particular non-limiting embodiment of the invention, with reference to the figures in the attached drawings, among which:

DETAILED DESCRIPTION OF EMBODIMENTS OF THE INVENTION

Figure 1:
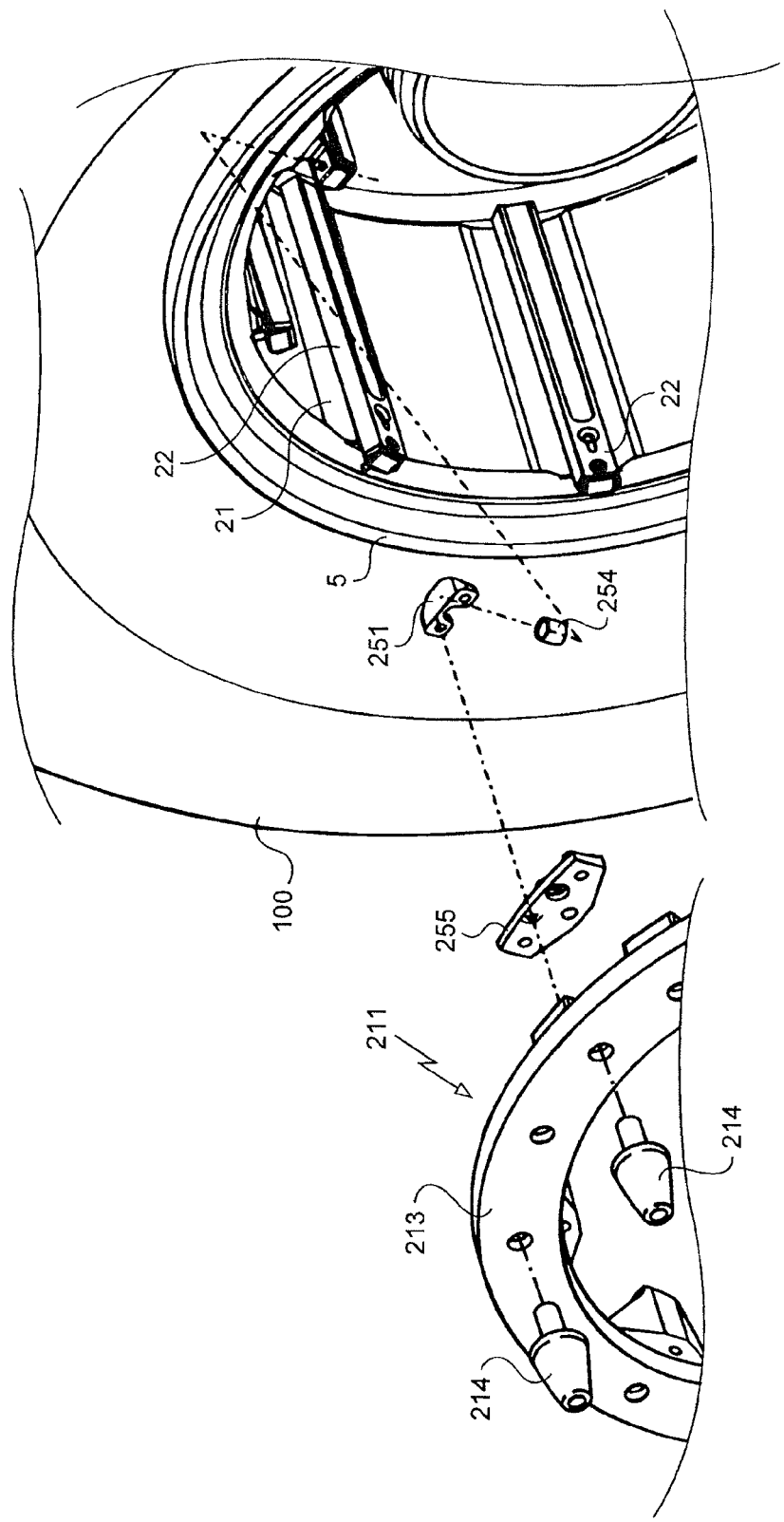
FIG. 1 is a partially stripped-down perspective view of an aircraft wheel rim showing the coupling of the driving means according to a first embodiment of the invention.
Figure 2:
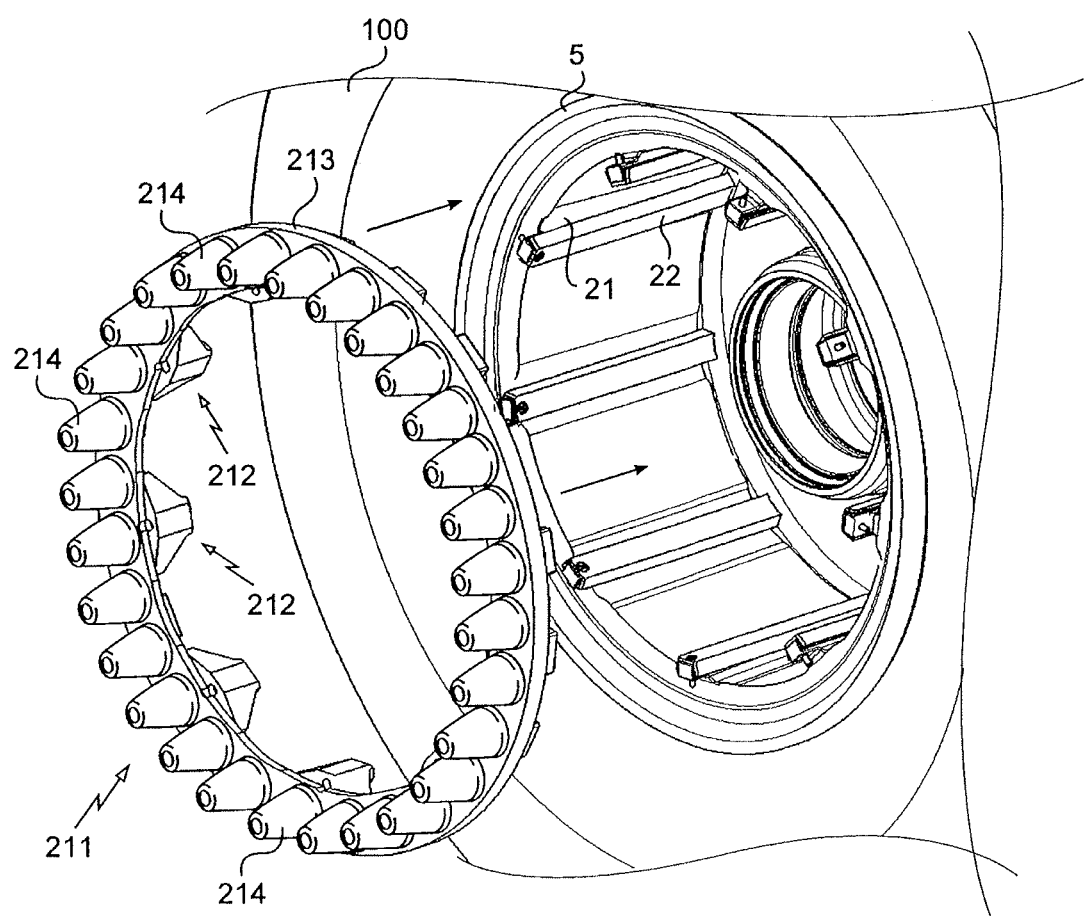
FIG. 2 is a corresponding view to that in FIG. 1 showing the assembly of the driving means on the rim in FIG. 1.
Figure 4:
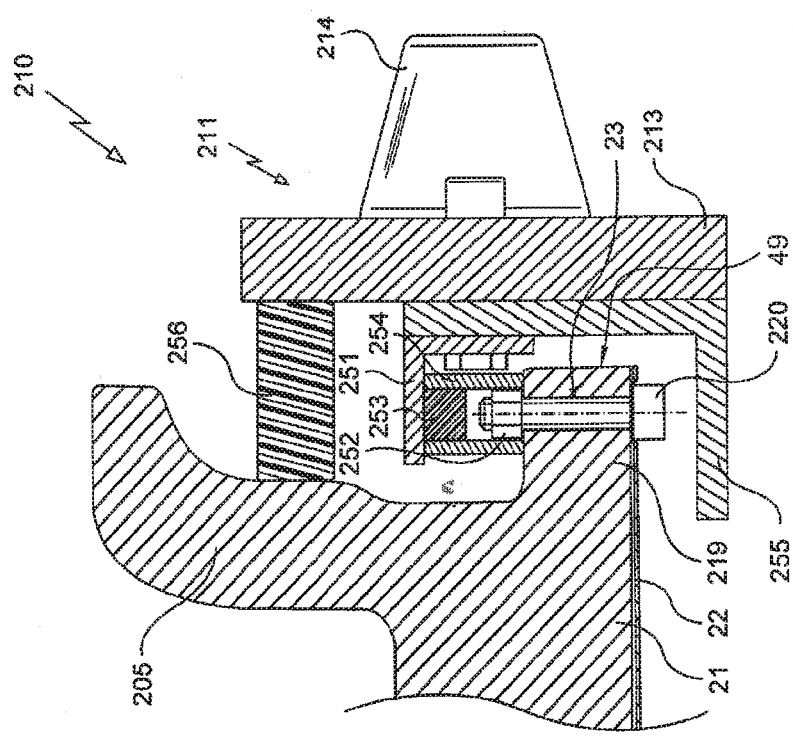
FIG. 4 is a sectional view of the support in FIG. 3 in situ on the rim.
Figure 3:
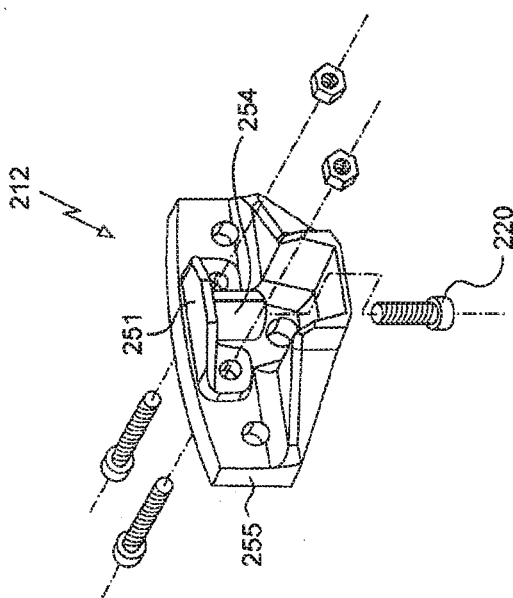
FIG. 3 is a perspective view of one of the coupling members in FIG. 2.
Figure 5:
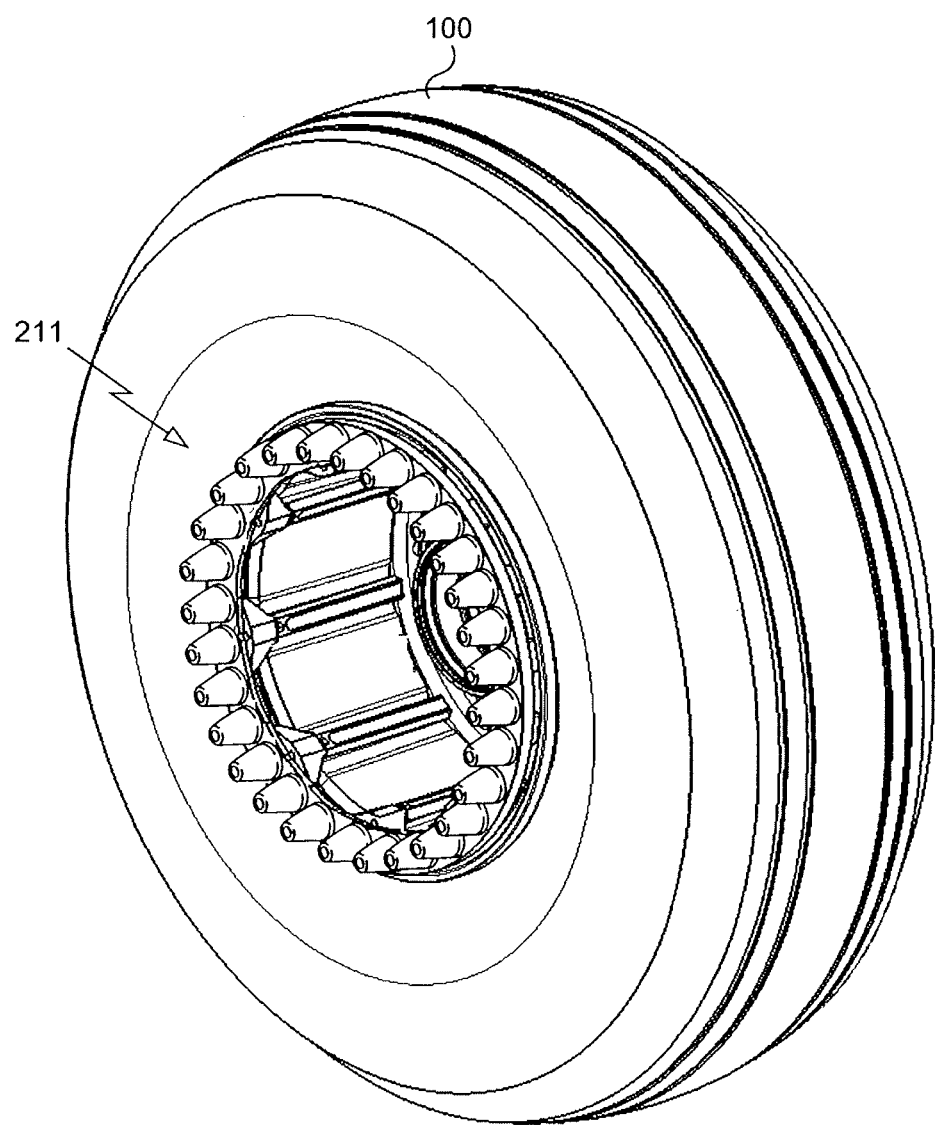
FIG. 5 is a perspective view of the wheel equipped with its driving means.

Illustrated in FIG. 1 is an aircraft wheel rim 5 intended to receive a tyre 100, as well as brake discs (not shown). The discs extent inside the rim and some of these discs (the rotor discs) are driven rotationally with the rim by means of keys 21 which in this case are covered by heat protection shields 22.

The wheel is equipped with rotational driving means 210 which in this case comprise a rigid ring gear 211. An independent coupling member 212 is interposed between the rim and the rotational driving means 210, in this case a drive gear 211 comprising an annular disc 213 on which protusions 214 are mounted to form driving teeth. In this case, the coupling member comprises a flange 251 which is associated with a nut 252 intended to receive a screw 220 which, moreover, serves to hold one of the heat shields 22. The screw 220 is engaged in an orifice 23 made through one end 49 of the key 21. In this case, the nut 252 is associated with the flange 251 by a silent block 253 which is integrated in a spacer 254.

The coupling member moreover comprises a plate 255 which is mounted on the flange 251 by two screws. The plate 255 comprises a lateral face which is intended to receive the disc 213. The plate 255 has a cowl protecting the end of the brake key.

Once the rim is fitted with its plates, it then remains for the disc 213 to be mounted on the plates 255. During the assembly of the disc 213 on the plates 255, elastomer stops 256 are interposed between the ring gear 211 and the rim 205 vertical to the plates 255, in order to cushion the axial stresses to which the drive gear is subjected.

In the example illustrated here, the ring gear of the driving means is intended to cooperate with a drive pinion of an actuator member supported by the landing gear on which the wheel is mounted to turn.

The disc 213 is preferably realized in a material with the same flexibility as that of the rim (for example in an aluminium alloy if the rim itself is in an aluminium alloy). In this way, the disc is able to follow deformations in the rim without overstressing said rim. The fixing of the driving means using fixing members which serve, moreover, to hold the heat protection shields of brake keys allows standard rims to be used which have already been certified and require no modification. Moreover, if new rims have to be created, the invention allows a certain simplification of the rim compared with the one in document EP 2 639 160 by removing the number of specific fixing end fittings.

The invention is not limited to what has just been described; on the contrary, it encompasses any variant falling within the framework defined by the claims.

The invention claimed is:

1. An aircraft wheel having a rim comprising brake disc driving keys (21), the wheel being provided with rotation drives (210) which comprise a drive gear (211) associated with coupling members (212) for coupling the drive gear to the rim of the wheel, the coupling members being fixed to the rim by fixing members (220) introduced into orifices of the rim extending at an end of the keys which are also used to hold heat shields protecting the rim.

2. The aircraft wheel according to claim 1, wherein the fixing member comprises a screw (220) which extends to hold both one of the coupling members of the drive gear and one of the heat shields.

3. The aircraft wheel according to claim 1, wherein the drive gear (211) comprises an annular disc (213) and the coupling members (212) are secured to the disc and the fixed to the rim.

4. The aircraft wheel according to claim 3, wherein each coupling member comprises a flange (251) which is attached by the fixing member (220) to the rim, the flange (251) supporting a plate (255) on which is mounted the annular disc (213).

5. The aircraft wheel according to claim 4, wherein the annular disc (213) is mounted on each plate (255) of the coupling members with elastomer stops (256) interposed between the disc (213) and the rim.

6. The aircraft wheel according to claim 3, wherein the annular disc (213) is made of a material having the same flexibility as that of the rim to follow the deformations thereof.

7. Aircraft wheel according to claim 3, wherein the annular disc bears a series of removable protrusions (214) forming the driving teeth of the rim during rotation.

* * * * *